G. P. TROTTA.
HORSESHOE.
APPLICATION FILED MAR. 2, 1917.

1,239,987.

Patented Sept. 11, 1917.

Inventor
Giuseppe P. Trotta

Attorneys

UNITED STATES PATENT OFFICE.

GIUSEPPE P. TROTTA, OF WILKES-BARRE, PENNSYLVANIA.

HORSESHOE.

1,239,987. Specification of Letters Patent. Patented Sept. 11, 1917.

Application filed March 2, 1917. Serial No. 152,102.

*To all whom it may concern:*

Be it known that I, GIUSEPPE P. TROTTA, a subject of the King of Italy, residing at Wilkes-Barre, in the county of Luzerne and State of Pennsylvania, have invented certain new and useful Improvements in Horseshoes; and I do hereby declare the following to be a full, clear, and exact description of the invention, such as will enable others skilled in the art to which it appertains to make and use the same.

This invention relates to horse shoes, and more particularly to a horse shoe composed of a main or base member for connection to the hoof of a horse and a separable calk member.

It is an object of the present invention to provide an improved horse shoe in which an increased purchase may be obtained, both in the forward pulling effort and the backing up effort of a horse, by providing a detachable or removable calk member adapted to be detachably connected to the horse shoe proper, the calk member being provided with peculiar calks so distributed as to give the maximum purchase to the horse and at the same time to obviate the liability to produce corns and lameness by the fracture of one or more of the calks, as for instance in the ordinary shoe.

The invention consists in the horse shoe comprising the peculiar base member adapted to be attached to the horse's hoof and its complementary calk ring applicable thereto.

With the above and other objects in view as will be made manifest in the following specification, an embodiment of the invention is illustrated in the accompanying drawing in which.

Figure 1:
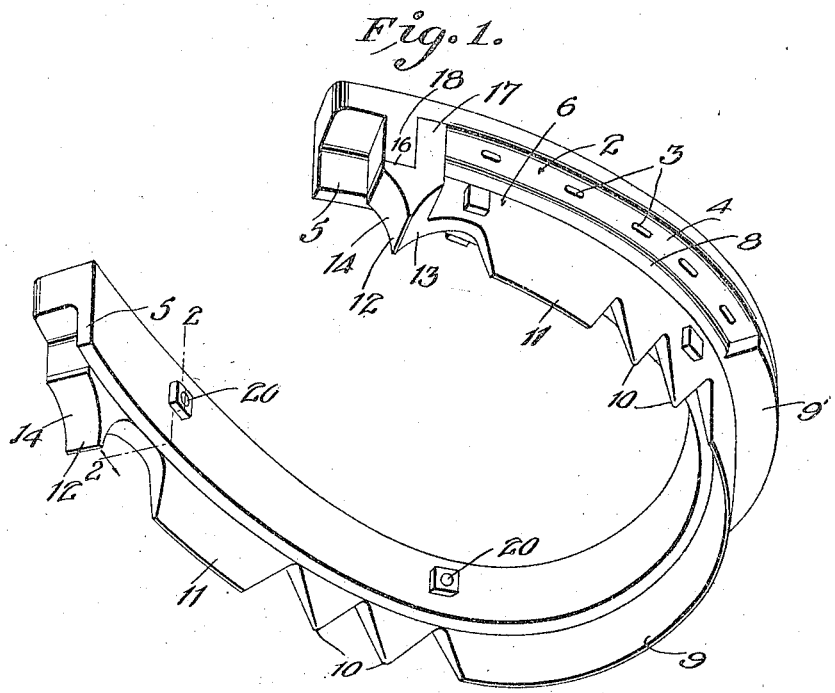
Figure 1 is an underneath perspective view of the improved horse shoe looking at one of the rear corners of the shoe.
Figure 2:
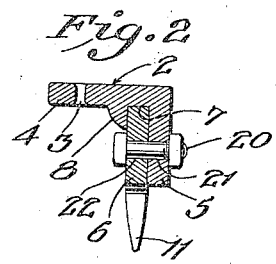
Fig. 2 is a cross section on line 2—2 of Fig. 1.

In the embodiment of the improved shoe there is illustrated a main or base member 2 provided with suitable nail holes 3 in one of its flanges as 4 for the attachment of the shoe member 2 to the horse's hoof. This member is preferably of the desired size and contour as may be requisite to fit the horse's hoof, and is composed of a horizontal arcuate flange portion 4 adapted to be applied flat to the bottom of the horse's hoof and which has at its interior edge an arcuate upstanding flange 5 of suitable height continuing from end to end around the flange portion 4. This member may be securely fastened to the horse's hoof as above indicated, and is adapted to be provided with a detachable or separable calk member in the form of a flat, arcuate bow 6 with downwardly tapering separated calks of suitable design to be hereinafter referred to. The upper edge of the calk member 6 is adapted to be firmly seated in a channel 7 formed between the outer face of the flange 5 and a parallel bead or ridge 8 depending below the face of the base flange 4 to a suitable depth to form the above mentioned channel 7.

The calk member 6 has a main body portion of a depth approximately equal to or slightly greater than the height of the flange 5, and at its forward or central connected portion is provided with a toe calk 9 preferably edged to form a narrow and elongated tread or tractive portion, and adjacent each of the ends of the toe calk 9 there are disposed pairs of pointed calks 10, here shown as of V shape, and next these on each side on the calk member 6 are provided intermediate side calks 11 preferably of considerable length and also sharpened at their ground-engaging edges to increase the tractive effect. The edges of the toe calk 9 and the side calks 11 lie in the line of the curvature of the member 6, and the ends of the latter are provided with opposite heel calks 12. These latter are provided with sharpened edges which are directed at an angle to the medial line of the shoe and have convergent front and rear walls 13 and 14, these providing for a maximum purchase effect in backing up or forward pull by the horse in driving. Below the heel calks 12 the calk member 6 is shown as undercut as at 16 and provided with an outwardly directed shoulder 17, the undercut portion and the shoulder being adapted to bear against a lug or bearing portion 18 formed therefor, one on each end of the base or shoe 2.

Any suitable means may be utilized to detachably secure the calk member 6 to the base or shoe 2, but preferably I utilize a plurality of bolts 20 which are adapted to be passed through alined perforations 21 and 22 in the flange 5 of the shoe member 2 and the calk member 6 when the latter has been adjusted so that its top edge is snugly seated in the channel or seat 7 provided therefor in the lower surface of the shoe.

The base or shoe member 2, being formed of right-angular cross section, is stiffened and braced so as to be firm and rigid and may be reinforced at its forward portion if desired by extending from the bead 8 forming the channel 7 a lip or toe portion 9′ of suitable width and thickness which will add to the strength of the member 2 and take the wear at that point during the use of the latter.

From the foregoing it will be seen that I have provided a horse shoe comprising a main or base member adapted to be firmly nailed to the horse's hoof and upon this is adapted to be applied detachably a calk forming member having a portion adapted to seat in a channel formed in the base of the horse shoe, and the calk member is provided with a toe calk and a pair of rear heel calks and with intermediate pointed side calks and elongated side calks, the latter being edged. Thus the liability of creating lameness in the horse's limb, or tendency to form corns, is eliminated by reason of the fact that a sufficient number of calks is provided so that in the event one or more should be broken, there is a sufficient and large enough area formed by the remaining calks to keep the horse's foot in a normal and proper angular position when the shoe is in use.

What I claim as new is:

1. A horse shoe having a base member of L-shaped cross section forming a depending inside flange encompassed by a shallow bead spaced outwardly therefrom on the lower face of the base, the latter provided with nail holes outside of the bead, a calk band deeper than the flange resting against the base in the channel formed by the bead and flange and lying against the flange, and means for detachably fastening the calk band to the flange.

2. The combination in a horseshoe, of a base member of L-shaped cross-section and forming a depending inside flange, the heels of the shoe having lugs in the angle between the flanges; and a calk band deeper than the flange resting against the under face of the base and lying against the flange, said band having heel lugs rabbeted to fit and underlap the base lugs, and means for detachably fastening said base and band.

3. The combination in a horseshoe, of a base member of L-shaped cross-section and forming a depending inside flange, the heels of the shoe having lugs in the angle between the flanges; and a calk band deeper than the flange resting against the under face of the base and lying against the flange, said band having heel lugs rabbeted to fit and underlap the base lugs, means for detachably fastening said base and band, said base having a narrow bead encompassing the edge of the band where it abuts the base.

4. The combination in a horseshoe, of a base member of L-shaped cross-section and forming a depending inside flange, the heels of the shoe having lugs in the angle between the flanges; and a calk band deeper than the flange resting against the under face of the base and lying against the flange, said band having heel lugs rabbeted to fit and underlap the base lugs, means for detachably fastening said base and band, said base having a narrow bead encompassing the edge of the band where it abuts the base, the band being notched at its wearing edge inwardly to a depth equal to the projection thereof below the base flange.

5. The combination in a horseshoe, of a base member of L-shaped cross-section and forming a depending inside flange, the heels of the shoe having lugs in the angle between the flanges; and a calk band deeper than the flange resting against the under face of the base and lying against the flange, said band having heel lugs rabbeted to fit and underlap the base lugs, means for detachably fastening said base and band, said base having a narrow bead encompassing the edge of the band where it abuts the base, the band being notched at its wearing edge inwardly.

In testimony whereof I affix my signature.

GIUSEPPE P. TROTTA.